(12) United States Patent
Meushaw et al.

(10) Patent No.: US 6,922,774 B2
(45) Date of Patent: Jul. 26, 2005

(54) DEVICE FOR AND METHOD OF SECURE COMPUTING USING VIRTUAL MACHINES

(75) Inventors: Robert V. Meushaw, Columbia, MD (US); Mark S. Schneider, Sykesville, MD (US); Donald N. Simard, Severn, MD (US); Grant M. Wagner, Columbia, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 867 days.

(21) Appl. No.: 09/854,818

(22) Filed: May 14, 2001

(65) Prior Publication Data

US 2002/0169987 A1 Nov. 14, 2002

(51) Int. Cl.[7] .............................. H04L 9/00; H04K 1/00; G06F 15/173
(52) U.S. Cl. .................. 713/151; 713/201; 380/30; 380/255; 380/280; 380/283
(58) Field of Search ................................. 713/151, 201; 380/30, 255, 280, 283; 709/223, 224

(56) References Cited

U.S. PATENT DOCUMENTS

| | | | |
|---|---|---|---|
| 5,201,049 A | | 4/1993 | Shorter |
| 5,504,814 A | | 4/1996 | Miyahara |
| 5,522,075 A | * | 5/1996 | Robinson et al. ........... 711/151 |
| 5,850,449 A | | 12/1998 | McManis |
| 5,893,084 A | * | 4/1999 | Morgan et al. ................ 706/50 |
| 2003/0037089 A1 | * | 2/2003 | Cota-Robles et al. .......... 709/1 |

OTHER PUBLICATIONS

Garfinkel et al. "Terra: A Virtual Machine–Based Platform for Trusted Computing", Oct. 2003, Proceedings of the nineteenth ACM Symposium on Operating systems principles, pp. 193–206.*

Robin, John S., et al., "Analysis of the Pentum's Ability to Support a Secure Virtual Machine Monitor", Proceedings of the 9th Usenix Security Symposium, XP002247347, Denver, Colorado, (Aug. 14, 2000), 1–17.*

* cited by examiner

*Primary Examiner*—Andrew Caldwell
*Assistant Examiner*—Courtney Fields
(74) *Attorney, Agent, or Firm*—Robert D. Morelli

(57) ABSTRACT

A device for and method of secure computing that includes a computer system having a processor; an operating-system software program loaded onto the processor; a type-II virtual machine monitor software program loaded onto the operating-system software program; a user-definable number of non-sensitive virtual-machines; a user-definable number of sensitive virtual-machines, where each sensitive virtual-machine has a user-definable sensitivity level; a user-definable number of encryption virtual-machines, where each encryption virtual-machine is connected to one of said user-definable number of sensitive virtual-machines, and where each encryption virtual-machine includes at least one encryption algorithm capable of encrypting information from the corresponding sensitive virtual-machine according to the corresponding sensitivity level; and a router virtual-machine connected to each non-sensitive virtual-machine and each encryption virtual-machine.

14 Claims, 3 Drawing Sheets

DEVICE FOR AND METHOD OF SECURE COMPUTING USING VIRTUAL MACHINES

FIELD OF THE INVENTION

The present invention relates, in general, to electrical computers and digital processing systems, processing systems for multiple computer or process coordinating and, in particular, to virtual machine task or process management.

BACKGROUND OF THE INVENTION

There is a need to access remote computer systems in a secure manner. Some previous attempts to solve this problem involved integrating security modules as applications or operating system components. These approaches could not be trusted to work properly if a computer was infected by a virus or other malicious code. Other attempts to solve this problem involved the use of separate hardware devices. One or more of the separate hardware devices were often custom devices. Custom devices typically operate differently from commercial devices and require a user to learn new operating procedures. The user was often reluctant, or unable, to do this. Furthermore, the interface of a custom device was often tailored to a particular version of current commercial devices to which it communicated. If the commercial device changed due to an advance in technology then a design change to the custom device was required. If the design change was not made then the remote-access solution containing the custom device was made obsolete. Moreover, device specific approaches to secure remote access were often not interoperable with other equipment. Therefore, there is a need for secure remote-access to a computer system that does not quickly become obsolete as technology advances. In addition, users desire computers that work like the commercial computers to which they are accustomed.

The typical computer system includes hardware (e.g., processor, keyboard, hard disk, floppy-disk, etc.) and operating-system software that runs on the processor to control the components of the computer system. A virtual machine monitor (VMM) is another software program that runs on the processor of the computer system to create a user-definable number of computing platform environments.

There are two types of virtual machine monitors. A type-I VMM runs directly on the processor of the computer system and controls all of the components of the computer system and the computer processes created therein. A type-II VMM runs on top of the operating-system software (i.e., the host operating-system software) and allows the host operating-system software to control the components of the computer system. The type-II VMM is more relevant to the present invention than the type-I VMM. A commercial product by VMware is an example of a type-II VMM.

Each computing environment created by a VMM runs operating-system software (i.e., guest operating-system software) that is either the same or different from the host operating-system software. Each computing environment is configured in software to emulate a complete computer system. These computing environments are referred to as virtual machines because they appear to the software running in them and to the user as a real computer system. However, these computer environments only exist in the software, or electronic configuration, running on the computer system. Virtual machines are useful for running old operating-system software on computer systems built to run new operating-system software and for testing the operation of experimental operating-system software.

U.S. Pat. No. 5,504,814, entitled "EFFICIENT SECURITY KERNEL FOR THE 80960 EXTENDED ARCHITECTURE," discloses a device for implementing the standards of "Department of Defense Trusted Computer System Evaluation Criteria," DOD 5200.28-STD, December 1985. The device is a custom device that uses virtual machines to isolate security subjects and dedicated logical resources. The device uses a single processor computer system running a single operating system. The virtual machines in U.S. Pat. No. 5,504,814 communicate with one another so that total separation does not exist between the virtual machines. The device and method of the present invention is not disclosed in U.S. Pat. No. 5,504,814. U.S. Pat. No. 5,504,814 is hereby incorporated by reference into the specification of the present invention.

U.S. Pat. No. 5,201,049, entitled "SYSTEM FOR EXECUTING APPLICATIONS PROGRAMS CONCURRENTLY/SERIALLY ON DIFFERENT VIRTUAL MACHINES," discloses a device for and method of executing predefined segments concurrently on different assigned virtual machines at the host processor by having a virtual machine manager create a pool of virtual machines at the host processor that are either run ready or idle, letting the virtual machine pool manager decide whether or not to send a segment to a run ready virtual machine for processing or to an idle virtual machine. The device and method of the present invention is not disclosed in U.S. Pat. No. 5,201,049. U.S. Pat. No. 5,201,049 is hereby incorporated by reference into the specification of the present invention.

U.S. Pat. No. 5,893,084, entitled "METHOD FOR CREATING SPECIFIC PURPOSE RULE-BASED N-BIT VIRTUAL MACHINES," discloses a device for and a method of implementing a virtual machine to do one specific task such as data typing, encryption, compression, arbitrary precision arithmetic, pattern recognition, data conversion, artificial intelligence, device drivers, data storage, and retrieval and digital communications and using rule sets to receive an n-bit input and produce an n-bit output, where the input and the output do not have to agree in bit length. The device and method of the present invention is not disclosed in U.S. Pat. No. 5,893,084. U.S. Pat. No. 5,893,084 is hereby incorporated by reference into the specification of the present invention.

U.S. Pat. No. 5,850,449, entitled "SECURE NETWORK PROTOCOL SYSTEM AND METHOD," discloses a device for and a method of securely transmitting objects containing executable programs in place of conventional data packets. U.S. Pat. No. 5,850,449 implements its device and method by encrypting all transmissions, which the present invention does not. U.S. Pat. No. 5,850,449 uses a virtual machine module to execute platform independent programs (e.g., JAVA programs). The device and method of the present invention is not disclosed in U.S. Pat. No. 5,850,449. U.S. Pat. No. 5,850,449 is hereby incorporated by reference into the specification of the present invention.

SUMMARY OF THE INVENTION

It is an object of the present invention to compute securely using commercially available computer technology.

It is another object of the present invention to compute securely using commercially available computer technology by moving security functions into separate virtual machines or into the host operating system to protect them from the end-user computing environment.

The present invention is a device for and a method of secure computing that includes a computer system on which a host operating-system software program controls resources of the computer system, and a type II virtual machine monitor that runs on top of the host operating-system software to create a user-definable number of virtual machines.

In the preferred embodiment, the virtual machines created on the present invention include a user-definable number of non-sensitive virtual-machines, a user-definable number of sensitive virtual-machines, a dedicated encryption virtual-machine connected to each sensitive virtual-machine, and a router virtual-machine connected to each non-sensitive virtual-machine and each encryption virtual-machine.

In an alternate embodiment, a server is added to the device and method described above, where the server is connected to each non-sensitive virtual-machine and each sensitive virtual-machine for facilitating the transfer of information from one virtual machine to another if appropriate.

In a second alternate embodiment, a checker implemented as either a computer or a virtual machine is added to check the operation of any virtual-machine and to disconnect the router virtual-machine, in the event of a malfunction of a virtual-machine, from any network to which it is connected.

DETAILED DESCRIPTION

The need for secure remote access continues to grow. Previous attempts to solve this problem were hardware specific, operated differently than commercial products, became obsolete with advances in commercial computer technology, or may not have been inter-operable with other equipment.

Users want the latest technology and want it to operate in a manner that is familiar to them (e.g., commercial computer systems).

The present invention is a device for and method of secure computing that is independent of the specific physical media used for network access and may be implemented in any commercially available computer system.

Figure 1:
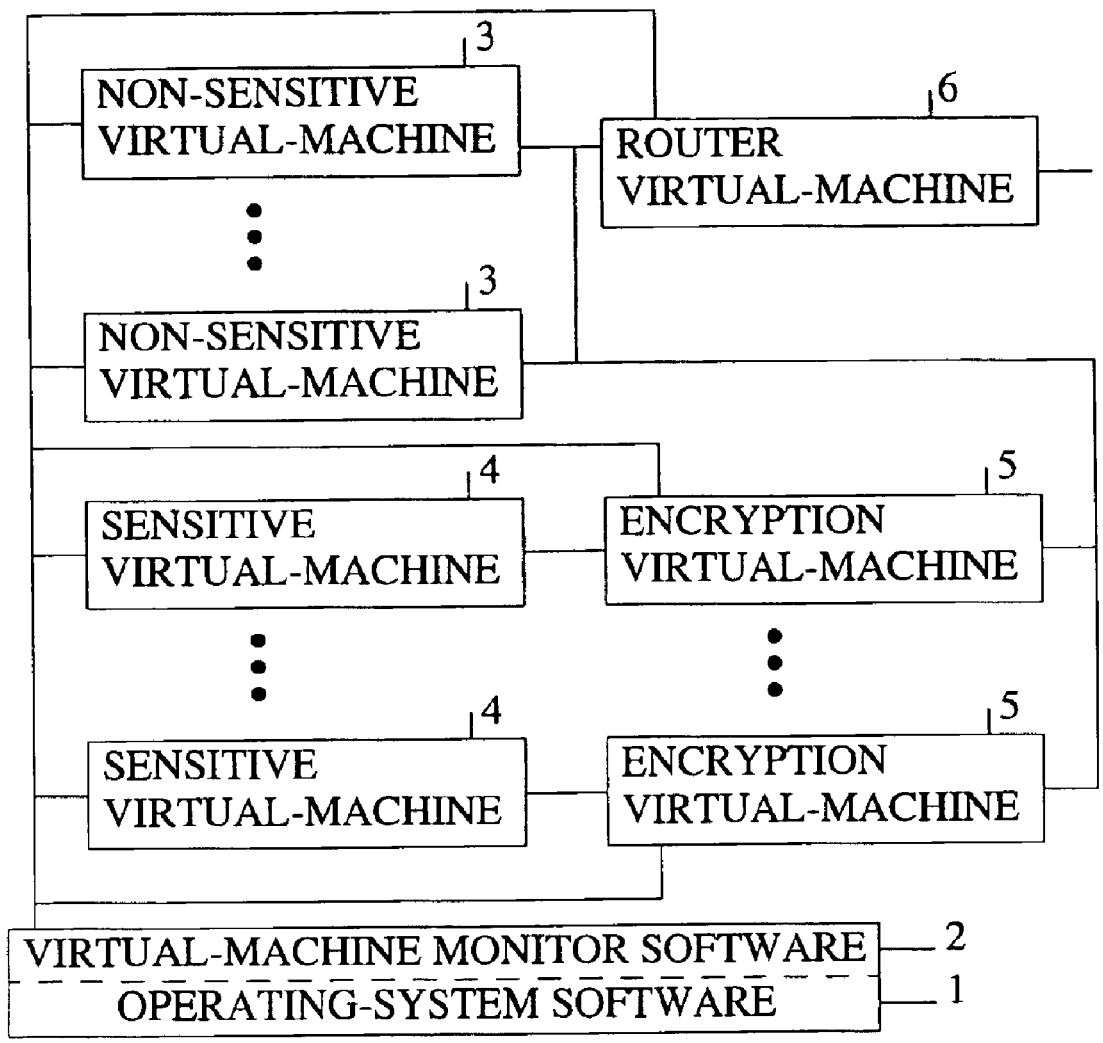
FIG. 1 is a schematic of the preferred embodiment of the present invention.

FIG. 1 is a schematic of the preferred embodiment of the present invention. The present invention is implemented onto a typical computer system having operating-system software 1 (i.e., host operating-system software) which runs on the processor of the computer system. The operating-system software controls all of the devices found in a typical computer system (e.g., processor, keyboard, hard-disk, floppy-disk, , etc.).

Running on the host operating-system software 1 is a type II virtual-machine monitor (VMM) 2. A type II VMM 2 runs on top of the host operating-system software 1 rather than directly on the system hardware and allows a user to create a user-definable number of virtual machines under the control of the host operating-system software 1. A virtual machine is a collection of programs and data that executes under the control of the VMM running on the host operating-system software and gives the user the impression of a real computer system running under the user's sole control.

Any operating-system software (i.e., guest operating-system software) or application may be run on a virtual machine, where the guest operating-system software may be the same as, or different from, the host operating-system software or the guest operating-system software of another virtual machine. This allows older operating system and applications software to be used as newer operating systems are developed. Examples of presently available operating-system software include Windows 95, Windows 98, Windows 2000, Windows ME, Windows NT, and Linux. Any other suitable operating-system software may be used in the present invention. A user-definable number of non-sensitive virtual-machines 3 are created for processing non-sensitive (e.g., unclassified) information, where each of the non-sensitive virtual-machines 3 is isolated from, and operates independently of, any other virtual machine in the present invention. Each non-sensitive virtual-machine 3 provides access to the transport network using the protocols of the Internet. The non-sensitive virtual-machines 3 are under the control of the host operating-system software 1. In the preferred embodiment, there is one non-sensitive virtual-machine 3.

A user-definable number of sensitive virtual-machines 4 are created for processing sensitive (e.g., classified) information, where each of the sensitive virtual-machines 4 is isolated from, and operates independently of, any other virtual machine in the present invention, and where each sensitive virtual-machine 4 may process information at a sensitivity level that is either the same as, or different from, that of another sensitive virtual-machine 4. Each sensitive virtual-machine 4 provides access to a secure area in a computer system (i.e., local or remote). A secure area in a computer system is an area that is accessible only through encrypted and/or authenticated connections.

The sensitive virtual-machines 4 are under the control of the host operating-system software 1. In the preferred embodiment, there is one sensitive virtual-machine 4 for each level of sensitive information to be processed.

An encryption virtual-machine 5 is created for, and is connected to, each sensitive virtual-machine 4 created, where each encryption machine 5 includes an encryption method sufficient to protect the sensitivity of the information of the corresponding sensitive virtual-machine 4 to which it is connected. The encryption virtual-machine 5 implements Internet Protocol Security (IPSec) standard. IPSec is a standard for security at the network or packet processing layer of network communication. The encryption virtual-machines 5 are under the control of the host operating-system software 1. Each encryption virtual-machine 5 may not only provide encryption capability but also digital signature capability and key exchange capability as well. Any suitable encryption method, key exchange method, and digital signature method may be used in the present invention.

The output of each non-sensitive virtual-machine 3 and each encryption virtual-machine 5 is connected to a router virtual-machine 6. The router virtual-machine 6 provides network access and routing for the other virtual machines according to a set of rules or filters.

The router virtual-machine 6 is under control of the host operating-system software 1. The router virtual-machine 6 routes and filters information between the present invention and another remote computer system.

The present invention provides the same level of security as does an architecture that uses separate components. However, the present invention achieves this level of security on a single computer component. This has previously been unattainable. In addition, the present invention saves the expense of having to purchase separate components. The present invention also allows for the use of old operating-system software as technology advances. New capabilities (e.g., virtual machines, operating systems, and applications software) can be installed in virtual machines without affecting the security provided. New network interface hardware can also be easily installed as the user desires.

Each of the virtual machines of the present invention can use non-persistent disk storage which does not retain changes made thereto during a session. This provides security because any successful attack by a hacker or malicious code during one session is only successful for that session. Any changes, including malicious ones, can be discarded so the attack would have to be repeated on each subsequent session, which may either not be successful or may be detected during the attempt.

Figure 2:
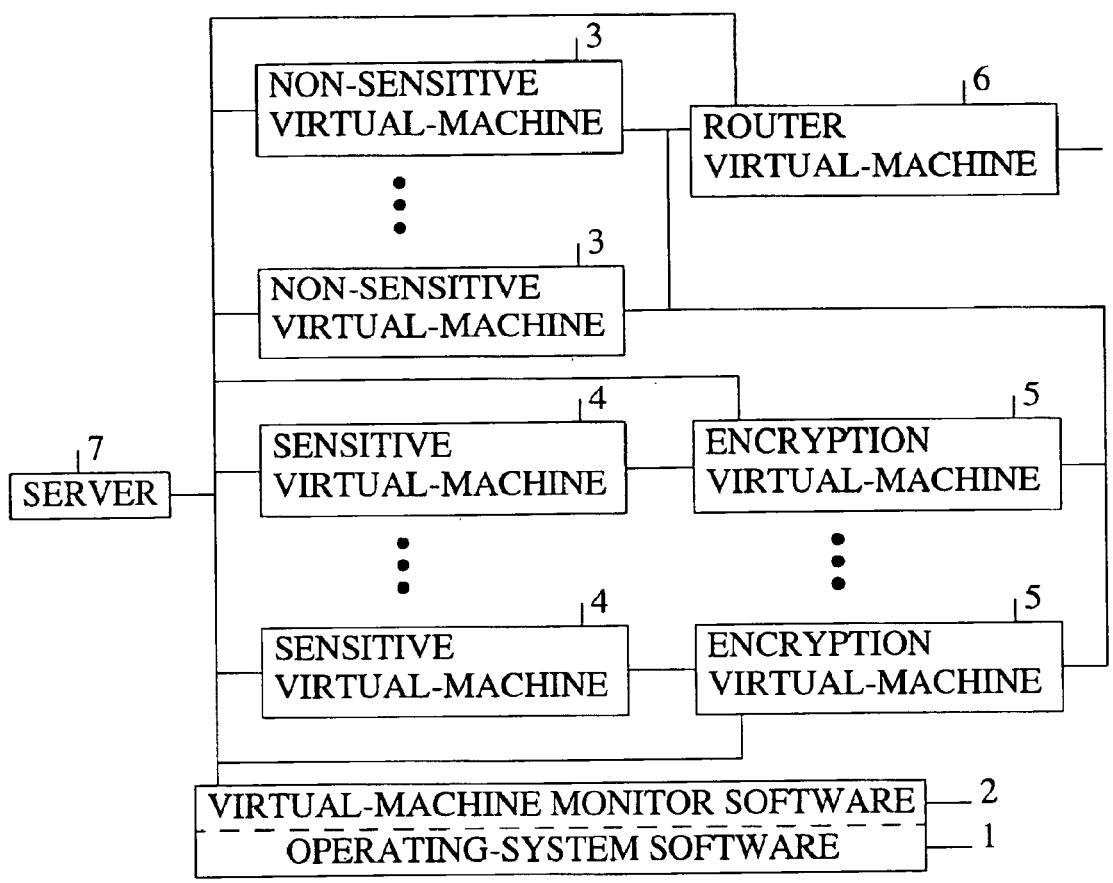
FIG. 2 is a schematic of an alternate embodiment of the present invention.

FIG. 2 is an alternate embodiment of the present invention that allows for the transfer of information from one virtual machine to another, but not directly. The schematic of FIG. 2 is the same as that of FIG. 1 with one addition, a server 7 is connected to each virtual machine. Each virtual machine can send information to the server 7 and the server 7 can send information it has to any virtual machine if appropriate. The server 7 contains user-definable rules for when a transfer is, or is not, appropriate to be transferred from one virtual machine to another. For example, it may be appropriate to send information from the non-sensitive virtual-machine 3 to any other virtual machine or from any sensitive virtual-machine 4 to any sensitive virtual-machine 4 of a higher-sensitivity, but not vice versa. Therefore, the server 7 provides a means of transferring information from one virtual machine to another when appropriate while maintaining isolation between virtual machines. The server 7 may be a virtual machine or a stand-alone device.

Figure 3:
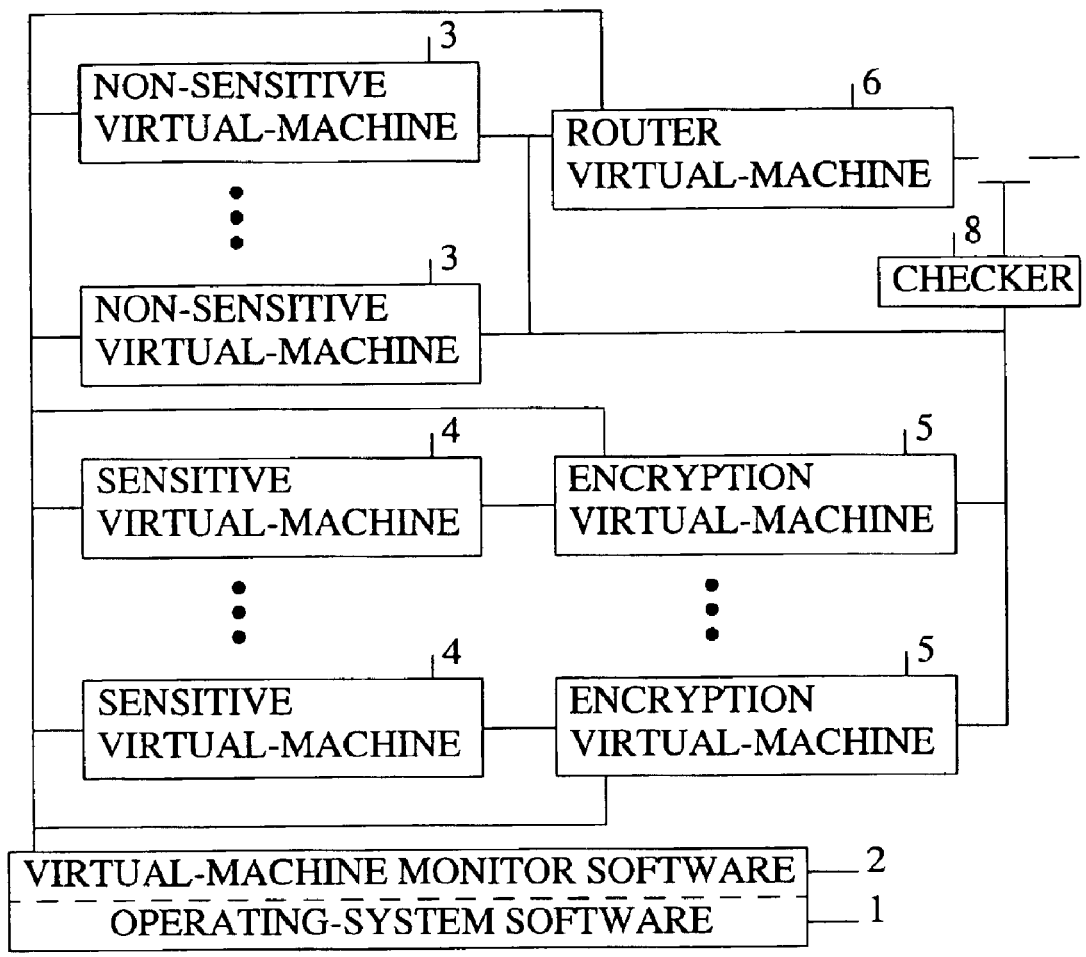
FIG. 3 is a schematic of a second alternate embodiment of the present invention.

FIG. 3 is a second alternate embodiment of the present invention that allows for the checking of the virtual-machines 5 to insure proper operation. The schematic of FIG. 3 is the same as that of FIG. 1 with one addition, checker 8 is connected to the output of each encryption virtual-machine 5 and the output of the router virtual-machine 6. The checker 8 is either a virtual machine or, for added security, a stand-alone device. A stand-alone device provides more security than an integrated function because access to, and tampering of, a standalone device is more difficult than an integrated function. It also provides more security because it's operation is independent of the virtual machines that it is checking. Upon the detection of a malfunction of a virtual-machine 5, the checker 8 disconnects the output of the router virtual-machine 6 from whatever network to which it was connected. The checker 8 may also be added to the schematic of FIG. 2.

What is claimed is:

1. A device for secure computing, comprising:
a) a computer system, where the computer system includes a processor;
b) an operating-system software-program loaded onto the processor of the computer system;
c) a type-II virtual-machine monitor software-program loaded onto the operating-system software-program of the computer system;
d) a user-definable number of non-sensitive virtual-machines;
e) a user-definable number of sensitive virtual-machines, where each sensitive virtual-machine has a user-definable sensitivity level;
f) a user-definable number of encryption virtual-machines, where each encryption virtual-machine is connected to one of said user-definable number of sensitive virtual-machines, and where each encryption virtual-machine includes at least one encryption algorithm capable of encrypting information from the corresponding sensitive virtual-machine according to the corresponding sensitivity level; and
g) a router virtual-machine connected to each non-sensitive virtual-machine and each encryption virtual-machine.

2. The device of claim 1, wherein said operating-system software program is selected from the group of operating-system software programs consisting of Windows 2000, Windows NT, Linux, and any other suitable operating-system software program.

3. The device of claim 1, wherein each of said encryption virtual-machines outputs information according to Internet Protocol Security standards.

4. The device of claim 1, wherein each of said encryption virtual-machine includes at least one encryption algorithm selected from the group of encryption algorithms consisting of an encryption algorithm, a key exchange algorithm, a digital signature algorithm, and any combination thereof.

5. The device of claim 1, further comprising a server connected to each non-sensitive virtual-machine and each sensitive virtual-machine.

6. The device of claim 5, wherein said server is selected from the group of servers consisting of a stand-alone device and a virtual machine.

7. The device of claim 1, further comprising a checker connected to each of said encryption virtual-machines and to the router virtual-machine.

8. The device of claim 7, wherein said checker is selected from the group of checkers consisting of a stand-alone device and a virtual machine.

9. A method of secure computing, comprising the steps of:
a) acquiring a computer system, where the computer system includes a processor;
b) loading a host operating-system software program onto the processor of the computer system;
c) loading a type-II virtual machine monitor software program onto the operating system of the computer system;
d) creating a user-definable number of non-sensitive virtual-machines;
e) creating a user-definable number of sensitive virtual-machines, where each sensitive virtual-machine has a user-definable sensitivity level;
f) creating a user-definable number of encryption virtual-machines, where each encryption virtual-machine is connected to one of said user-definable number of sensitive virtual-machines, and where each encryption virtual-machine includes at least one encryption algorithm capable of encrypting information from the corresponding sensitive virtual-machine according to the corresponding sensitivity level; and
g) creating a router virtual-machine connected to each non-sensitive virtual-machine and each encryption virtual-machine.

10. The method of claim 9, wherein said step of loading a host operating-system software-program is comprised of the step of loading an operating-system software program selected from the group of operating-system software programs consisting of Windows 2000, Windows NT, Linux, and any other suitable operating system.

11. The method of claim 9, wherein said step of creating a user-definable number of encryption virtual-machines is comprised of the step of creating a user-definable number of encryption virtual-machines that each outputs information according to an Internet Protocol Security standard.

12. The method of claim 9, wherein said step of creating a user-definable number of encryption virtual-machines is comprised of the step of creating a user-definable number of encryption virtual-machines wherein each encryption virtual-machine includes at least one encryption algorithm selected from the group of encryption algorithms consisting of an encryption algorithm, a key exchange algorithm, a digital signature algorithm, and any combination thereof.

13. The method of claim 9, further comprising the step of transferring information between each of said non-sensitive virtual-machine and sensitive virtual-machine when appropriate.

14. The method of claim 9, further comprising the step of checking to see that each encryption virtual-machine is operating properly and, if not, disconnecting the router virtual-machine from a network.

* * * * *